United States Patent [19]

Yasuda et al.

[11] Patent Number: 5,244,939

[45] Date of Patent: Sep. 14, 1993

[54] IMIDAZOLE COMPOUND-CONTAINING HARDENING AGENT COMPOSITION, METHOD OF PREPARING THE SAME AND THERMOSETTING EPOXY RESIN COMPOSITION

[75] Inventors: Akira Yasuda, Saitama; Rihei Nagase, Tokyo, both of Japan

[73] Assignee: Somar Corporation, Tokyo, Japan

[21] Appl. No.: 592,743

[22] Filed: Oct. 4, 1990

[30] Foreign Application Priority Data

Oct. 6, 1989 [JP] Japan ................... 1-261819

[51] Int. Cl.⁵ ............. C09J 163/02; C08L 63/02; C08G 59/68
[52] U.S. Cl. ........................... 523/211; 523/443; 523/466; 525/486; 528/117
[58] Field of Search ............. 523/443, 466, 211; 252/182.18, 182.13; 528/117; 525/486

[56] References Cited

U.S. PATENT DOCUMENTS

| | | | |
|---|---|---|---|
| 3,533,987 | 10/1970 | Giambra et al. | 260/37 |
| 3,755,253 | 8/1973 | Rice | 528/117 |
| 3,923,571 | 12/1975 | Aoki et al. | 528/117 |
| 3,996,175 | 12/1976 | Schreiber et al. | 523/466 |
| 4,335,228 | 6/1982 | Beitchman et al. | 528/117 |
| 4,417,010 | 11/1983 | Shimp | 528/117 |
| 4,499,246 | 2/1985 | Tesson et al. | 528/94 |
| 4,826,991 | 5/1989 | Sawa et al. | 528/117 |
| 4,891,403 | 1/1990 | Farris | 525/26 |

FOREIGN PATENT DOCUMENTS

| | | |
|---|---|---|
| 5438520 | 9/1977 | Japan . |
| 5931143 | 8/1982 | Japan . |
| 6166762 | 9/1984 | Japan . |
| 63-286460 | 5/1987 | Japan . |
| 63-161018 | 7/1988 | Japan . |

*Primary Examiner*—John C. Bleutge
*Assistant Examiner*—D. R. Wilson
*Attorney, Agent, or Firm*—Sughrue, Mion, Zinn, Macpeak & Seas

[57] ABSTRACT

A hardening agent composition for epoxy resins and a method for forming the composition is disclosed, which comprises a low-reactive hardening agent, an imidazole compound and a zeolite, wherein the imidazole compound is substituted on the imidazole nucleus by at least one of (a) and (b): (a) an alkyl group having 2 or more carbon atoms and a polar group and (b) an alkenyl group. The hardening agent composition combined with an epoxy resin to form a thermosetting epoxy resin composition, capable of hardening under heat to give a hardened product, has a remarkably elevated adhesion strength.

12 Claims, No Drawings

IMIDAZOLE COMPOUND-CONTAINING HARDENING AGENT COMPOSITION, METHOD OF PREPARING THE SAME AND THERMOSETTING EPOXY RESIN COMPOSITION

FIELD OF THE INVENTION

The present invention relates to a hardening agent composition for epoxy resins, which has both excellent storage stability and excellent thermosetting reactivity. The present invention also relates to a method of manufacturing the hardening agent composition and to a thermosetting epoxy resin composition containing the hardening agent composition.

BACKGROUND OF THE INVENTION

Hitherto, various thermosetting epoxy resin compositions comprising an epoxy resin, a low-reactive hardening agent and a hardening promoter have been known. Such thermosetting epoxy resin compositions are required to have excellent storage stability in order that the hardening reaction of the compositions does not proceed during storage of the compositions. Additionally, such compositions are required to have excellent thermosetting reactivity in order that the compositions may rapidly harden under heat. However, in such thermosetting epoxy resin compositions, storage stability and thermosetting reactivity properties are, in theory, somewhat contradictory to each other. In general, therefore, it has been difficult for such compositions to satisfy both properties of high storage stability and high thermosetting reactivity. In fact, no composition is known which can adequately satisfy both of these properties.

For instance, in order to improve storage stability, formation of complexes with a reaction promoter or formation of inclusion compounds with a cyclodextrin has been proposed. In these cases, however, there is a drawback in that the hardening reactivity of the resin composition is undesirably lowered. On the other hand, incorporation of microcapsules containing a reaction promoter into the resin composition has also been proposed (JP-B-43-17654 —the term "JP-B" as used herein means an "examined Japanese patent publication"). In this case, however, there is a problem in that the cost of manufacturing the composition is unacceptably high for practical purposes. Additionally, there is another problem in that the microcapsules incorporated are easily broken. Incorporation of a hardening promoter which is stable to heat and which is latent-hardening, for example, a combination comprising tetraphenyl phosphonium tetraphenyl borate and triphenylphosphine (JP-A-61-113614 —the term "JP-A" as used herein means an "examined published Japanese patent application") or an addition compound obtained by reacting a tertiary amine compound having a hydroxyl or mercapto group and a polyfunctional epoxy compound (JP-A-60-4524), into the resin composition has also been proposed. However, the illustrated techniques also have some drawbacks, i.e., the composition having good storage stability is unsatisfactory with respect to the hardening reactivity thereof, while the composition having satisfactory hardening reactivity has an unsatisfactory storage stability.

JP-A-63-161018 discloses a method of obtaining a thermosetting epoxy resin composition having both excellent storage stability and excellent hardening reactivity, in which a low-reactive hardening agent, a hardening promoter and a zeolite are blended while the hardening agent and the hardening promoter are melted, the resulting blend is cooled and solidified, the resulting solid is powdered into a fine powder, and the powder is incorporated into a thermosetting epoxy resin as a hardening agent. However, the thus-obtained epoxy resin composition still has a problem in that the adhesion strength of the hardened product formed by the composition is insufficient. Accordingly, when the epoxy resin composition is coated on a metal plate as a powdery coating composition, the resin coat film to be formed on the metal plate undesirably peels off from the plate if an external force such as bending stress, is imparted to the coated plate.

SUMMARY OF THE INVENTION

One object of the present invention is to provide an improved thermosetting epoxy resin composition comprising a hardening agent composition (which comprises a low-reactive hardening agent, a hardening promoter and a zeolite), and an epoxy resin, which gives a hardened product having an elevated adhesion strength.

Another object of the present invention is to provide such a hardening agent composition to be incorporated into the thermosetting epoxy resin composition of the invention, as well as to provide a method of preparing such a hardening agent composition.

In accordance with the above objects and advantages, the present invention relates to a hardening agent composition for epoxy resins comprising a low-reactive hardening agent, an imidazole compound and a zeolite, wherein the imidazole compound is substituted on the imidazole nucleus by at least one of (a) and (b): (a) an alkyl group having 2 or more carbon atoms and a polar group and (b) an alkenyl group.

The present invention also relates to a method of producing a powdery hardening agent composition, comprising blending a low reactive hardening agent, an imidazole compound substituted on the imidazole nucleus by at least one of (a) and (b): (a) an alkyl group having 2 or more carbon atoms and a polar group and (b) an alkenyl group, and a zeolite, while melting the low-reactive hardening agent and the imidazole compound, cooling the resulting blend to attain a solidified composition, and powdering the solidified composition to give a powdery hardening agent composition.

The present invention also relates to a thermosetting epoxy resin composition comprising an epoxy resin and a hardening agent composition, in which the hardening agent composition is as defined above.

DETAILED DESCRIPTION OF THE INVENTION

The "low-reactive hardening agent" used in the present invention is defined as a hardening agent which hardly causes a hardening reaction of an epoxy resin by itself when it is blended singly with a molten epoxy resin. More specifically, the low-reactive hardening agent has a gelling time at 150° C. of about more than 180 seconds, when mixed with an epoxy resin in an equivalent addition amount. The low-reactive hardening agent for use in the present invention may be any known one, including, for example, solid polycarboxylic acids, organic acid anhydrides, phenol-novolac type or cresol-novolac type resin hardening agents and hydrazide compounds.

In the present invention, the imidazole compound has at least one substituent on the imidazole nucleus selected from the following (a) and (b). The imidazole compound is used as a hardening promoter. The substituent(s) may be located at any desired position on the imidazole nucleus, but the 1- or 2-position of the nucleus is preferred.

(a) An alkyl group having 2 or more carbon atoms and a polar group. The number of carbon atoms of the alkyl group is preferably from 2 to 17, more preferably from 2 to 11. Preferred polar groups include, for example, an amino group, a substituted amino group (as a substituent, e.g., $-CH_3$, $-C_2H_5$, $-C_3H_7$), an amido group, an ureido group, an aldehyde group, a hydroxyl group, a cyano group, a carboxy group, an alkoxy group, an acyl group, an alkoxycarbonyl group, and a nitro group. The polar group may be bonded at any position of the alkyl chain or at the terminal carbon atom thereof.

(b) An alkenyl group. The number of carbon atoms of this group is preferably from 2 to 5, more preferably from 2 to 17. The double bond in the alkenyl group may be positioned at any desired position of the chain or at the terminal thereof.

Specific examples of imidazole compounds which may be used in the present invention include 1-aminoethyl-2-methylimidazole, N-[1-(2-methylimidazolyl)-ethyl]-urea, 1-[(1-cyanoethyl)amino]-ethyl-2-methylimidazole 1-(2-hydroxyethyl)imidazole, 1-(2-hydroxyethyl)2-methylimidazole, 1-vinylimidazole, 2-methyl-1-vinylimidazole and 1-allylimidazole.

Various known zeolites, preferably having a pore diameter of about 5 Å or less, can be employed in the present invention. For instance, hydrogen-type or salt-type (for example, sodium, calcium, magnesium or like metal salt-types) zeolites can be employed. Preferred are salt-type zeolites; and especially preferred is a calcium salt-type synthetic zeolite (e.g., Molecular sieve 5A of Union Showa K. K., Molecular sieve 5A of Fuji-Davison Chemical Ltd., Zeolum 5A of TOSOH Corp.). The zeolite for use in the invention preferably has a mean grain size of from 0.1 to 50 microns, more preferably from 1 to 20 microns.

The amount of the imidazole hardening promoter used in the present invention is preferably from 3 to 50 parts by weight, more preferably from 10 to 30 parts by weight, to 100 parts by weight of zeolite. The minimun amount of the low-reactive hardening agent used in the present invention is an amount effective to cover the zeolite added to the hardening agent composition of the invention. Generally speaking, the amount of the low-reactive hardening agent is on the order of at least 10 parts by weight, preferably from 50 to 500 parts by weight, to 100 parts by weight of zeolite.

The hardening agent composition of the present invention may be prepared as follows. A low-reactive hardening agent, an imidazole compound and a zeolite are first blended while the low-reactive hardening agent and the imidazole compound are melted. Any other hardening agent and hardening promoter may optionally be added to the blending system, if desired, in appropriate amounts. The low-reactive hardening agent, the imidazole compound and the zeolite may be heated for a time sufficient to melt the low-reactive hardening agent and the imidazole compound; blending is effected under such heating conditions. Alternatively, a liquid or solid imidazole compound may be added to a heated zeolite so that the imidazole compound is coordinated on the surfaces of the zeolite grains and thereafter a low-reactive hardening agent is added to the imidazole compound-coordinated zeolite, whereupon the resulting blend is melted. The blending temperature can be defined in functional terms, i.e., such that both the hardening agent and the imidazole compound are melted at the blending temperature. Generally speaking, the blending temperature usually falls within the range of from 80° to 180° C.

In accordance with the present invention, the thus obtained molten blend is then cooled to room temperature and solidified and thereafter finely powdered to give a powder. The resulting powder is used as a hardening agent composition.

In order to obtain a thermosetting epoxy resin composition which contains the hardening agent composition of the present invention, the powdery hardening agent composition is added and blended with a molten epoxy resin. The blending temperature is that at which the epoxy resin to be blended may be melted. In general, the temperature may be the softening point of the epoxy resin to be blended (where two or more epoxy resins are used in combination, the temperature is desirably the softening point of the mixed epoxy resins), or may be a temperature higher than the softening point by 5° to 30° C., preferably 5° to 15° C. higher. The thus obtained molten blend is cooled, solidified and finely powdered to give a powdery thermosetting epoxy resin composition. The thus obtained composition rapidly hardens, when heated to a temperature higher than the blending temperature. For instance, when the blending temperature is 110° C., the resin composition may harden when heated up to 130° to 200° C.

The epoxy resin is not particularly limited, and is generally of the type used in preparing known epoxy resin compositions. More specifically, the epoxy resin has at least two epoxy groups in one molecule and the number average molecular weight is generally 500 to 10,000, preferably 800 to 5,000. For instance, there are mentioned various epoxy resins of bisphenol-A type, bisphenol-S type, bisphenol-F type, phenol-novolac type or cresol-novolac type, as well as glycidyl-ester type epoxy resins, glycidyl-amine type epoxy resins, alicyclic epoxy resins, linear aliphatic epoxy resins, heterocyclic epoxy resins and halogenated (especially brominated) epoxy resins, may be used. The epoxy resin may be used singly or as a mixture of two or more. The epoxy resin for use in the present invention may be any one which is solid at room temperature, or it may be a mixture of a solid epoxy resin and a proper amount of a liquid epoxy resin, as long as the mixture is solid at room temperature.

Regarding the proportions of the ingredients comprising the thermosetting epoxy resin composition of the present invention, the low-reactive hardening agent is preferably present in an amount of from 0.5 to 1.5, more preferably from 0.6 to 1.3, as the functional group equivalent thereof, taking the epoxy equivalent of the epoxy resin as 1 (one) (where a combination of plural epoxy resins is used, the epoxy equivalent of the mixture of plural epoxy resins is used). The amount of the imidazole hardening promoter in the resin composition is preferably from 0.02 to 20 parts by weight, more preferably from 0.1 to 10 parts by weight, to 100 parts by weight of the epoxy resin. The amount of the zeolite in the resin composition is preferably from 0.2 to 100 parts by weight, more preferably from 0.5 to 50 parts by weight, to 100 parts by weight of the epoxy resin. The weight ratio of the zeolite to the imidazole hardening promoter is from preferably 2/1 to 30/1, more preferably from 3/1 to 10/1. The resin composition of the present invention may contain further conventional auxiliary additives, for example, a filler such as silica or calcium carbonate or a flow-adjusting agent, if desired.

As described above, the hardening agent composition of the present invention contains a particular imidazole compound, which is believed to cause an efficient reaction with an epoxy resin, thus giving a hardened product having a surprisingly elevated adhesion strength.

In the thermosetting epoxy resin composition of the present invention, since a specific imidazole compound adheres to the surfaces of zeolite grains and the surfaces thereof are further protected with a low-reactive hardening agent (it is considered that direct contact of the hardening promoter and the low-reactive hardening agent to the epoxy resin is substantially avoided), the epoxy resin composition has remarkable and surprisingly excellent storage stability. Moreover, the resin composition of the invention rapidly hardens when heated at a high temperature. When the resin composition of the invention is heated at a high temperature, the imidazole compound and the low-reactive hardening agent are believed to be brought into contact with the epoxy resin in the composition because of the thermal motion of the components under heat. Additionally, since the imidazole compound used in the present invention has a rapid hardening reactivity with the mixture comprising the epoxy resin and the hardening agent in the composition, the resin composition of the invention rapidly hardens under heat.

The resin composition of the present invention can widely be utilized in various fields, for example, as a powdery coating composition, an insulating sealant material for electrical parts or electronic parts, and a thermosetting shaping material, like other conventional epoxy resin compositions.

The present invention will be explained in more detail by way of the following Examples, which, however, are not intended to restrict the scope of the present invention.

Components used in the following Examples are as follows:

Epoxy Resin A

Epikote 1004 (manufactured by Yuka Shell Epoxy K.K.) (bisphenol-A type epoxy resin having a softening point of 97° C., a number average molecular weight of 1,600 and an epoxy equivalent of 925)

Epoxy Resin B

EOCN-104 (manufactured by Nippon Kayaku Co., Ltd.) (ortho-cresol-novolac type epoxy resin having a softening point of 95° C., a number average molecular weight of 1,400 and an epoxy equivalent of 235)

Zeolite

Molecular sieve 5A (manufactured by Union Showa K. K.) (having a pore diameter of about 5 Å, a mean grain size of about 5 microns and a maximum grain size 10 microns or less)

Silica

Powdered silica (Crystallite AA, manufactured by Tatsumori Ltd., having a mean grain size of 5 microns).

Phenol-Novolac Resin

Tamanol 754 (manufactured by Arakawa Chemical Industry Co.) (phenol-novolak resin having a softening point of 100° C. and a phenolic hydroxyl group equivalent of 105).

Methods of measuring the properties of samples shown in Tables below and methods of evaluating them are as follows:

150° Gelling Time (sec)

The thermosetting time is measured in accordance with JIS C 2104.

Adhesion Strength (kg/cm$^2$)

One surface of a polished soft steel plate (having a size of 20 mm×100 mm×30 mm) is further polished with sand paper (#150) to form a clean surface, which is then degreased with acetone and then dried. A pair of such plates are used as adhesion test pieces. These test pieces are placed in a drying oven set at 150° C. for 30 minutes and the thus pre-heated test pieces are then taken out from the furnace. An appropriate amount of a coating composition sample to be tested is immediately coated on the polished surface of one test piece, and the coated sample is then sandwiched between the polished surfaces of the pair of test pieces by the use of a fixing pinch cock. The thus adhered test pieces are then immediately placed in a different drying oven set at 150° C. where the coated composition is hardened for a predetermined period of time so that test pieces are bonded to each other with the hardened adhesive. In the test, the adhered area is 20 mm×15 mm.

The tensile shear adhesion strength of the thus adhered samples is measured by the use of Tensilon UMT-5000 (manufactured by Orientec Co.)

MANUFACTURE OF HARDENING AGENT COMPOSITIONS

Manufacture Example 1

Hardening Agent Composition (1) having the components mentioned below was prepared:

| (a) Phenol-Novolac Resin | 180 parts |
| (b) Zeolite | 100 parts |
| (c) 2-Methylimidazole | 10 parts |

Components (b) and (c) were brought into contact with each other in a 5-liter kneader having a settled oil-jacket temperature of 150° C. for 30 minutes, and component (a) was added thereto and kneaded for 60 minutes. The resulting blend was taken out, cooled, solidified and then finely powdered to obtain Hardening Agent Composition (1).

MANUFACTURE EXAMPLE 2

Hardening Agent Composition (2) having the components mentioned below was prepared:

| (a) Phenol-Novolac Resin | 180 parts |
| (b) Silica | 100 parts |
| (c) 2-Methylimidazole | 10 parts |

Components (b) and (c) were brought into contact with each other in a 5-liter kneader having a settled oil-jacket temperature of 150° C. for 30 minutes, and component (a) was added thereto and kneaded for 60 minutes. The resulting blend was taken out, cooled, solidified and then finely powdered to obtain Hardening Agent Composition (2).

MANUFACTURE EXAMPLE 3

Hardening Agent Composition (3) having the components mentioned below was prepared:

| (a) Phenol-Novolac Resin | 180 parts |
|---|---|
| (b) Zeolite | 100 parts |
| (c) 1-Aminoethyl-2-methylimidazole | 30 parts |

Components (b) and (c) were brought into contact with each other in a 5-liter kneader having a settled oil-jacket temperature of 50° C. for 30 minutes, and component (a) was added thereto and kneaded for 60 minutes while the oil temperature was elevated up to ° C. The resulting blend was taken out, cooled, solidified and then finely powdered to obtain Hardening Agent Composition (3).

MANUFACTURE EXAMPLE 4

Hardening Agent Composition (4) having the components mentioned below was prepared:

| (a) Phenol-Novolac Resin | 180 parts |
|---|---|
| (b) Silica | 100 parts |
| (c) 1-Aminoethyl-2-methylimidazole | 15 parts |

Components (b) and (c) were brought into contact with each other in a 5-liter kneader having a settled oil-jacket temperature of 50° C. for 30 minutes, and component (a) was added thereto and kneaded for 60 minutes while the oil temperature was elevated up to 150° C. The resulting blend was taken out, cooled, solidified and then finely powdered to obtain Hardening Agent Composition (4).

MANUFACTURE EXAMPLE 5

Hardening Agent Composition (5) having the components mentioned below was prepared:

| (a) Phenol-Novolac Resin | 180 parts |
|---|---|
| (b) Zeolite | 100 parts |
| (c) N-(2-methylimidazolyl-1-ethyl)-urea | 30 parts |

Components (b) and (c) were brought into contact with each other in a 5-liter kneader having a settled oil-jacket temperature of 100° C. for 30 minutes, and component (a) was added thereto and kneaded for 60 minutes while the oil temperature was elevated up to 150° C. The resulting blend was taken out, cooled, solidified and then finely powdered to obtain Hardening Agent Composition (5).

MANUFACTURE EXAMPLE 6

Hardening Agent Composition (6) having the components mentioned below was prepared:

| (a) Phenol-Novolac Resin | 180 parts |
|---|---|
| (b) Silica | 100 parts |
| (c) N-(2-methylimidazolyl-1-ethyl)-urea | 30 parts |

Components (b) and (c) were brought into contact with each other in a 5-liter kneader having a settled oil-jacket temperature of 100° C. for 30 minutes, and component (a) was added thereto and kneaded for 60 minutes while the oil temperature was elevated up to 150° C. The resulting blend was taken out, cooled, solidified and then finely powdered to obtain Hardening Agent Composition (6).

MANUFACTURE EXAMPLE 7

Hardening Agent Composition (7) having the components mentioned below was prepared:

| (a) Phenol-Novolac Resin | 180 parts |
|---|---|
| (b) Zeolite | 100 parts |
| (c) 1-(2-Hydroxyethyl)-2-methylimidazole | 20 parts |

Components (b) and (c) were brought into contact with each other in a 5-liter kneader having a settled oil-jacket temperature of 180° C. for 30 minutes, and component (a) was added thereto and kneaded for 60 minutes. The resulting blend was taken out, cooled, solidified and then finely powdered to obtain Hardening Agent Composition (7).

MANUFACTURE EXAMPLE 8

Hardening Agent Composition (8) having the components mentioned below was prepared:

| (a) Phenol-Novolac Resin | 180 parts |
|---|---|
| (b) Silica | 100 parts |
| (c) 1-(2-Hydroxyethyl)-2-methylimidazole | 20 parts |

Components (b) and (c) were brought into contact with each other in a 5-liter kneader having a settled oil-jacket temperature of 180° C. for 30 minutes, and component (a) was added thereto and kneaded for 60 minutes. The resulting blend was taken out, cooled, solidified and then finely powdered to obtain Hardening Agent Composition (8).

Each of Hardening Agent Compositions (1) to (8) prepared as described above was blended with epoxy resins as indicated in Table 1 below by the use of an extruder, during which the resin-melting temperature was 110° C. The resulting blend was then cooled and solidified and thereafter roughly pulverized with an atomizer. Next, the pulverized blend was finely powdered with a pin-mill type powdering machine to give a thermosetting epoxy resin-containing powdery coating composition having a size of 60-mesh pass.

The 150° C.-gelling time and the adhesion strength of the each of the thus obtained coating composition samples were measured, and the results obtained are shown in Table 1 below.

TABLE 1

| | Composition No. | | | | | | | |
|---|---|---|---|---|---|---|---|---|
| | 1* | 2* | 3 | 4* | 5 | 6* | 7 | 8* |
| Epoxy Resin A | 80 | 80 | 80 | 80 | 80 | 80 | 80 | 80 |
| Epoxy Resin B | 20 | 20 | 20 | 20 | 20 | 20 | 20 | 20 |
| Hardening Agent Composition (1) | 29 | | | | | | | |
| Hardening Agent Composition (2) | | 29 | | | | | | |

TABLE 1-continued

| | Composition No. | | | | | | | |
|---|---|---|---|---|---|---|---|---|
| | 1* | 2* | 3 | 4* | 5 | 6* | 7 | 8* |
| Hardening Agent Composition (3) | | | 31 | | | | | |
| Hardening Agent Composition (4) | | | | 29.5 | | | | |
| Hardening Agent Composition (5) | | | | | 31 | | | |
| Hardening Agent Composition (6) | | | | | | 31 | | |
| Hardening Agent Composition (7) | | | | | | | 30 | |
| Hardening Agent Composition (8) | | | | | | | | 30 |
| 150° C.-Gelling Time (sec) | 59.0 | 54.0 | 60.0 | 60.0 | 103.0 | 99.0 | 68.0 | 70.0 |
| Adhesion Strength (kg/cm$^2$) | 160.5 | 153.5 | 233.3 | 151.1 | 236.6 | 154.4 | 221.3 | 151.7 |

Note: Asterisked number indicates comparative examples. The amount of the composition is part by weight.

While the invention has been described in detail and with reference to specific embodiments thereof, it will be apparent to one skilled in the art that various changes and modifications can be made therein without departing from the spirit and scope thereof.

What is claimed is:

1. A thermosetting epoxy resin composition comprising an epoxy resin and a hardening agent composition, wherein the hardening agent composition comprises a low-reactive hardening agent, an imidazole compound and a zeolite, the imidazole compound being substituted on the imidazole nucleus by an alkyl group having 2 to 17 carbon atoms and a polar group.

2. The thermosetting epoxy resin composition as in claim 1, in which the proportion of the functional group equivalent of the low-reactive hardening agent is from 0.5 to 1.5 per one epoxy group equivalent of the epoxy resin, the proportion of the imidazole compound is from 0.02 to 20 parts by weight to 00 parts by weight of the epoxy resin, the proportion of the zeolite is from 0.2 to 100 parts by weight to 100 parts by weight of the epoxy resin, and the weight ratio of the zeolite to the imidazole compound is from 2/1 to 30/1.

3. The thermosetting epoxy resin composition as in claim 2, in which the proportion of the functional group equivalent of the low-reactive hardening agent is from 0.6 to 1.3 per one epoxy group equivalent of the epoxy resin, the proportion of the imidazole compound is from 0.1 to 10 parts by weight to 100 parts by weight of the epoxy resin, the proportion of the zeolite is from 0.5 to 50 parts by weight to 100 parts by weight of the epoxy resin, and the weight ratio of the zeolite to the imidazole compound is form 3/1 to 10/1.

4. The thermosetting epoxy resin composition as in claim 1, wherein the alkyl group has 2 to 11 carbon atoms, and a polar group.

5. The thermosetting epoxy resin composition as in claim 1, wherein the low-reactive hardening agent is selected from the group consisting of solid polycarboxylic acids, organic acid anhydrides, phenol-novolac resins, cresol-novolac resins, and hydrazide compounds.

6. The thermosetting epoxy resin composition as in claim 1, wherein the zeolite has a port diameter of about 5 Å or less and a mean grain size of 0.1 to 50 microns.

7. The thermosetting epoxy resin composition as in claim 6, wherein the mean grain size is from 1 to 20 microns.

8. The thermosetting epoxy resin composition as in claim 1, wherein the imidazole compounds are selected from the group consisting of 1-aminoethyl-2-methylimidazole, N-[1-(2-methylimidazolyl)-ethyl]-urea, 1-[(1-cyanoethyl)amino]-ethyl-2-methylimidazole, 1-(2-hydroxyethyl)imidazole and, 1-(2-hydroxyethyl)-2-methylimidazole.

9. The thermosetting epoxy resin composition as in claim 1, in which the proportion of the imidazole compound is from 3 to 50 parts by weight to 100 part by weight of zeolite.

10. The thermosetting epoxy resin compositions as in claim 1, in which the proportion of the low-reactive hardening agent is at least 10 parts by weight to 100 parts by weight of zeolite.

11. The thermosetting epoxy resin composition as in claim 9, in which the portion of the imidazole compound is from 10 to 30 parts by weight to 100 parts by weight of zeolite.

12. The thermosetting epoxy resin composition as in claim 10, in which the portion of the low-reactive hardening agent is from 50 to 500 parts by weight to 100 parts by weight of zeolite.

* * * * *